(12) United States Patent
Kaneda

(10) Patent No.: US 11,569,035 B2
(45) Date of Patent: Jan. 31, 2023

(54) CERAMIC ELECTRONIC DEVICE

(71) Applicant: TAIYO YUDEN CO., LTD., Tokyo (JP)

(72) Inventor: Kazumi Kaneda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 70 days.

(21) Appl. No.: 17/338,414

(22) Filed: Jun. 3, 2021

(65) Prior Publication Data

US 2021/0407735 A1 Dec. 30, 2021

(30) Foreign Application Priority Data

Jun. 29, 2020 (JP) .............................. JP2020-111709
Apr. 5, 2021 (JP) .............................. JP2021-064015

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
CPC ........ H01G 4/1227; H01G 4/30; H01G 4/012; H01G 4/1209; H01G 4/12
See application file for complete search history.

(56) References Cited

U.S. PATENT DOCUMENTS

| 2018/0233284 | A1* | 8/2018 | Taniguchi | ............ H01G 4/1227 |
| 2019/0035554 | A1* | 1/2019 | Inomata | ................. H01G 4/224 |
| 2019/0051459 | A1* | 2/2019 | Mizuno | ................... H01G 4/012 |

FOREIGN PATENT DOCUMENTS

| JP | 2004356305 A | 12/2004 |
| JP | 2014165447 A | 9/2014 |
| JP | 6105326 B2 | 3/2017 |

OTHER PUBLICATIONS

Takeoka et al., Thermally Stimulated Current Studies on Resistance Degradation of Ni-MLCC, Ferroelectrics, 356, 2007, pp. 78-84 (Year: 2007).*

(Continued)

*Primary Examiner* — David M Sinclair
*Assistant Examiner* — Daniel M Dubuisson
(74) *Attorney, Agent, or Firm* — Law Office of Katsuhiro Arai

(57) ABSTRACT

A ceramic electronic device includes a multilayer structure in which each of a plurality of dielectric layers and each of a plurality of internal electrode layers are alternately stacked. A relationship of "$I_A/I_B > 0.30$" is satisfied and a peak current value $I_B$ is 100 pA/mm² or less in a TSDC in which a polarizing temperature is 150 degrees C., a polarizing electric field is 15 V/μm to 20 V/μm, a polarizing time is 60 minutes, and an increasing speed of temperature is 10° C./minute, when a peak current of a low temperature side of a temperature range of 160 degrees C. or more and less than 230 degrees C. is $I_A$ and a peak current of a high temperature side of a temperature range of 230 degrees C. or more and 350 degrees C. or less is $I_B$.

20 Claims, 6 Drawing Sheets

(56) References Cited

OTHER PUBLICATIONS

Zhang et al., Polarization Response and Thermally Stimulated Depolarization Current of BaTiO3-based Y5V Ceramic Multilayer Capacitors, J. Am. Ceram. Soc., 97 [9], 2014, pp. 2921-2927 (Year: 2014).*
Wu et al., Thermally stimulated depolarization current study on barium titanate single crystals, AIP Advances 8, 2018, pp. 045005 (Year: 2018).*
Chazono et al., dc-Electrical Degradation of the BT-Based Material for Multilayer Ceramic Capacitor with Ni internal Electrode: Impedance Analysis and Microstructure, Japanese Journal of Applied Physics, Sep. 2001, pp. 5624-5629, vol. 40.

* cited by examiner

CERAMIC ELECTRONIC DEVICE

CROSS-REFERENCE TO RELATED APPLICATION

This application is based upon and claims the benefit of priority of the prior Japanese Patent Application No. 2020-111709, filed on Jun. 29, 2020 and the prior Japanese Patent Application No. 2021-064015, filed on Apr. 5, 2021, the entire contents of which are incorporated herein by reference.

FIELD

A certain aspect of the present invention relates to a ceramic electronic device.

BACKGROUND

There is a report in which an insulation degradation occurs when oxygen vacancies in a dielectric layer are accumulated in a cathode because of electric field and an electrical resistance in an interface between the cathode and the dielectric layer is reduced in a ceramic electronic device such as a multilayer ceramic capacitor, and a time until the accumulation determines a lifetime of the ceramic electronic device (for example, see "dc-Electrical Degradation of the BT-Based Material for Multilayer Ceramic Capacitor with Ni internal Electrode: Impedance Analysis and Microstructure, Jpn J Appl Phys, 40(2001) pp. 5624-5629").

There is disclosed a technology in which reliability such as the lifetime or resistance to voltage can be improved by reducing an amount of the oxygen vacancies (for example, see Japanese Patent Application Publication No. 2004-356305 hereinafter referred to as Document 1 and Japanese Patent Application Publication No. 2014-165447 hereinafter referred to as Document 2). In Document 1 and Document 2, a concentration of the oxygen vacancies is quantified with use of a TSDC (Thermally Stimulated Depolarization Currents).

SUMMARY OF THE INVENTION

In Document 1 and Document 2, the amount of the oxygen vacancies is estimated from an integral value of a current of the TSDC data. However, it is a part of the oxygen vacancies moving to the cathode over a crystal grain boundary of the dielectric layer that largely influences on the lifetime of the ceramic electronic device. Neither Document 1 nor Document 2 discloses the fact.

According to an aspect of the present invention, there is provided a ceramic electronic device including: a multilayer structure in which each of a plurality of dielectric layers and each of a plurality of internal electrode layers are alternately stacked, a main component of the plurality of dielectric layers being a ceramic, wherein a relationship of "$I_A/I_B > 0.30$" is satisfied and a peak current value $I_B$ is 100 pA/mm$^2$ or less in a TSDC in which a polarizing temperature is 150 degrees C., a polarizing electric field is 15 V/μm to 20 V/μm, a polarizing time is 60 minutes, and an increasing speed of temperature is 10° C./minute, when a peak current of a low temperature side of a temperature range of 160 degrees C. or more and less than 230 degrees C. is $I_A$ and a peak current of a high temperature side of a temperature range of 230 degrees C. or more and 350 degrees C. or less is $I_B$.

According to another aspect of the present invention, there is provided a ceramic electronic device including: a multilayer structure in which each of a plurality of dielectric layers and each of a plurality of internal electrode layers are alternately stacked, a main component of the plurality of dielectric layers being a ceramic, wherein a relationship of "$(J170-J150)/J150 \geq 0$" is satisfied in a TSDC in which a polarizing time is 60 minutes, a polarizing electric field is 10 V/μm, a polarizing temperature is 150 degrees C. or 170 degrees C., the plurality of dielectric layers are polarized, an increasing speed of temperature is 10° C./minute after cooling to 130 degrees C., when a peak current value of a polarization at 150 degrees C. among peak currents in a case of a temperature rise to 350 degrees C. is J150 and a peak current value of a polarization at 170 degrees C. among the peak currents is J170.

DETAILED DESCRIPTION

A description will be given of an embodiment with reference to the accompanying drawings.

Figure 1:
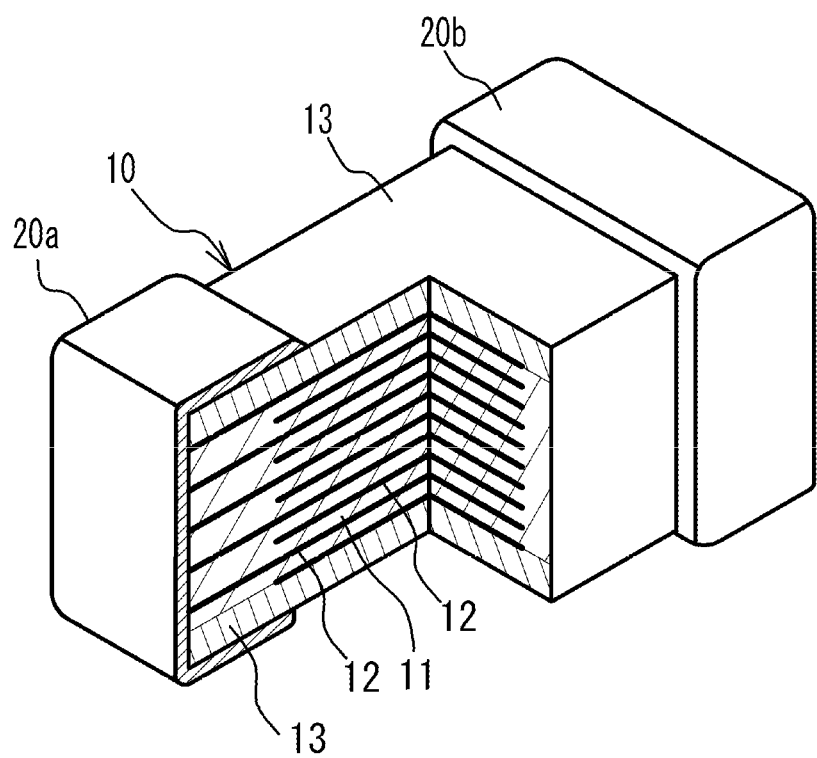
FIG. 1 illustrates a perspective view of a multilayer ceramic capacitor in which a cross section of a part of the multilayer ceramic capacitor is illustrated.

(First embodiment) A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof.

The dielectric layers 11 are mainly composed of a ceramic material that is expressed by a general formula $ABO_3$ and has a perovskite structure. The perovskite structure includes $ABO_3$-a, having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. For example, the dielectric layers 11 are formed by firing ceramic raw material powder of which a main component is a ceramic material having a perovskite structure.

In the multilayer ceramic capacitor 100, the insulation degradation occurs, when the oxygen vacancies in the dielectric layer 11 are accumulated in an interface between the internal electrode layer 12 and the dielectric layer 11 because of the electrical field of the internal electrode layer 12 acting as a cathode and reduces the electrical resistance in the interface. There is a report that a time until the accumulation determines the lifetime. The report is accepted widely. It is known that the reliability such as the lifetime or resistance to voltage can be improved when the amount of the oxygen vacancies is reduced in accordance with the model. For example, it is possible to estimate a movement amount of the oxygen vacancies by TSDC (Thermal Stimulation Depolarization Current).

Figure 2A:
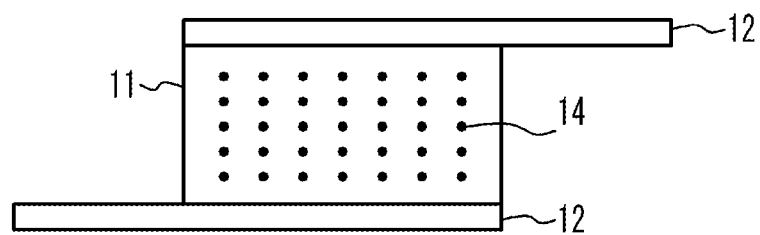
FIG. 2A to FIG. 2E illustrate a method of estimation of a movement amount of oxygen vacancies by using a TSDC.

For example, FIG. 2A to FIG. 2E illustrate a method for estimating the movement amount of the oxygen vacancy with use of the TSDC. FIG. 2A illustrates a cross sectional view of the dielectric layer 11 sandwiched by the internal electrode layer 12 connected to one of the external electrodes and the internal electrode layer 12 connected to the other of the external electrodes. As illustrated in FIG. 2A, oxygen vacancies 14 exist in the dielectric layers 11. For example, the oxygen vacancies 14 are evenly distributed in the dielectric layers 11.

Figure 2B:
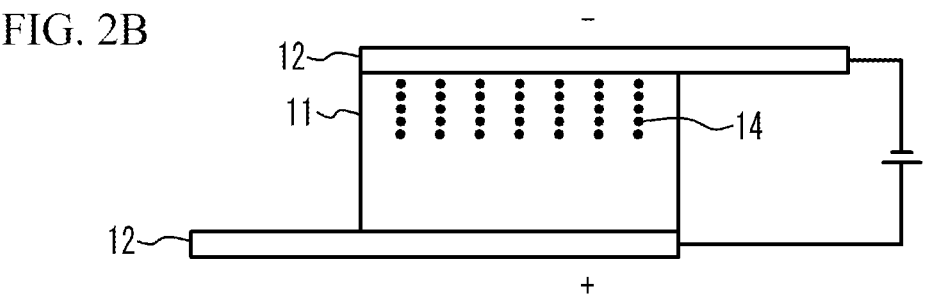

FIG. 2B partially illustrates the multilayer ceramic capacitor 100 in which a direct current voltage is applied to a part between the two internal electrode layers 12 next to each other and the part is heated. The oxygen vacancies 14 distributed evenly in the dielectric layer 11 are unevenly distributed on the side of one of the internal electrode layers 12 (minus electrode side in FIG. 2B), when the unloaded multilayer ceramic capacitor 100 is heated and the direct current voltage is applied between the two internal electrode layers 12 next to each other. In this case, the temperature is, for example, 200 degrees C. The electric field strength applied to the dielectric layer 11 is, for example, 10 V/μm.

Figure 2C:
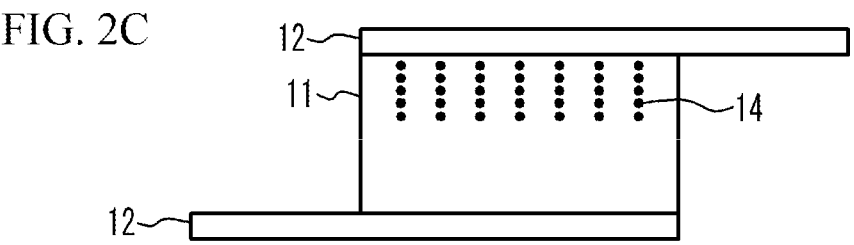

FIG. 2C illustrates a case where the condition of the multilayer ceramic capacitor 100 under a high temperature load is returned to the unloaded condition at a room temperature (25 degrees C.). Even if the voltage is canceled after the temperature is returned to the room temperature (25 degrees C.), the oxygen vacancies 14 are still unevenly distributed on the side of the one (the minus electrode side).

Figure 2D:
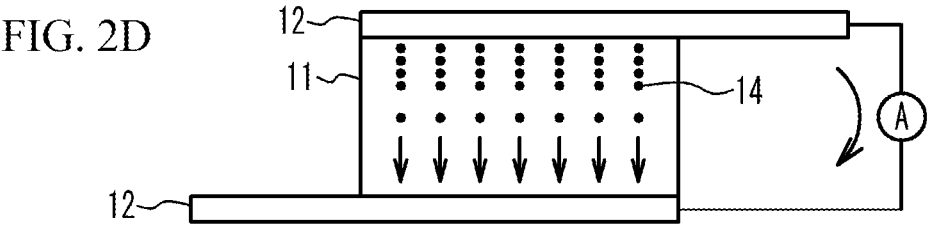
Figure 2E:
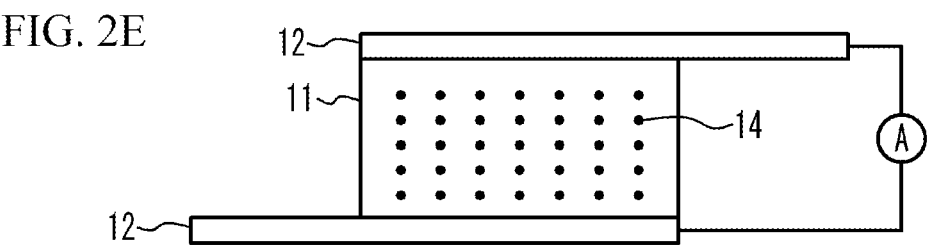

When the multilayer ceramic capacitor 100 is equipped with a current meter and the multilayer ceramic capacitor 100 is re-heated, the oxygen vacancies 14 unevenly distributed on the side of the one of the internal electrode layers 12 (the minus electrode side) in the dielectric layer 11 gradually moves toward the other of the internal electrode layers 12, as illustrated in FIG. 2D. The oxygen vacancies 14 act as carriers. Thus, a current flows. The current is called a thermally stimulated current. The temperature after the re-heating is approximately 300 degrees C. As illustrated in FIG. 2E, the thermally stimulated current occurs until the polarization caused by the oxygen vacancies 14 is canceled. Therefore, a time-integration of the current until the polarization is canceled is a total amount Q of the carrier charge in the dielectric layer 11.

The measured charge Q is divided by a charge per one oxygen vacancy 14 and the volume of the dielectric layer 11. Thus, the oxygen vacancy concentration in the multilayer ceramic capacitor 100 is calculated. The charge per one oxygen vacancy is $2 \times 1.6 \times 10^{-19}$ coulombs. An absolute value of the charge is expressed by Vo' as a minus fixed charge. Therefore, an absolute value of the charge is twice as elementary electrical charge. In this manner, it is possible to estimate the amount of the oxygen vacancy from the integral of the current value.

Figure 3A:
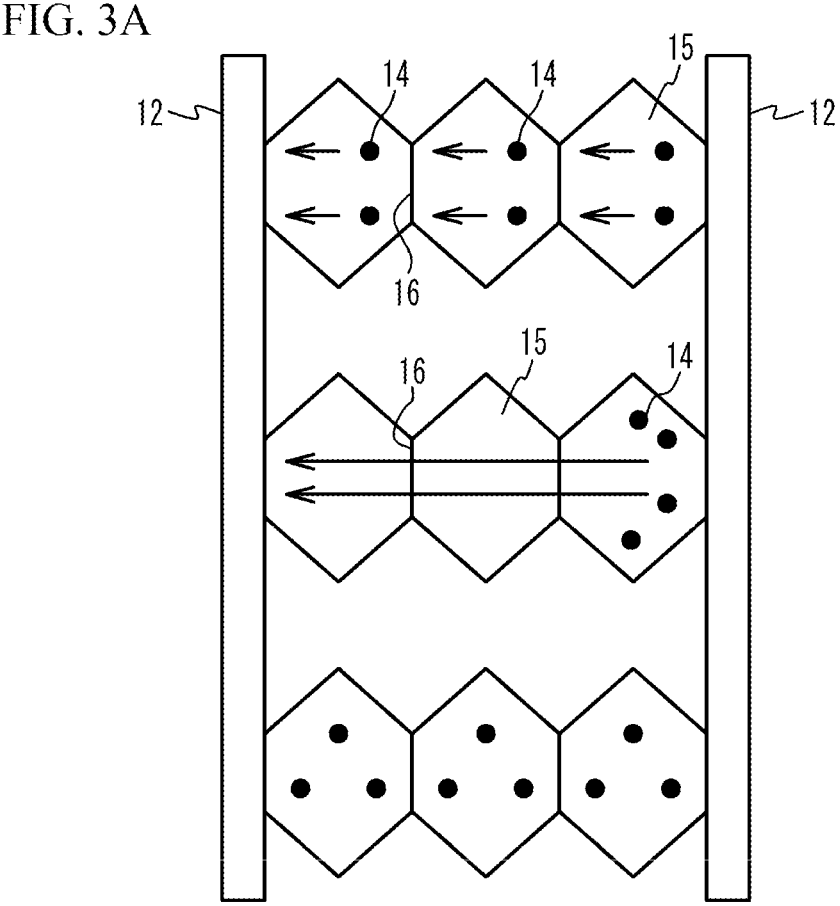
FIG. 3A illustrates movement of oxygen vacancies.

A description will be given of a moving of the oxygen vacancy during occurring of the thermal stimulation current. FIG. 3A illustrates the moving of the oxygen vacancy. As illustrated in FIG. 3A, the dielectric layer 11 includes a plurality of crystal grains 15. A crystal grain boundary 16 is formed between two of the crystal grains 15. As illustrated in an upper part of FIG. 3A, the oxygen vacancy 14 moves in the crystal grain 15. As illustrated in a middle part of FIG. 3A, the oxygen vacancy 14 crosses over the crystal grain boundary 16. The oxygen vacancy 14 crossing over the crystal grain boundary 16 of the dielectric layer 11 largely influences on the lifetime of the multilayer ceramic capacitor 100.

Figure 3B:
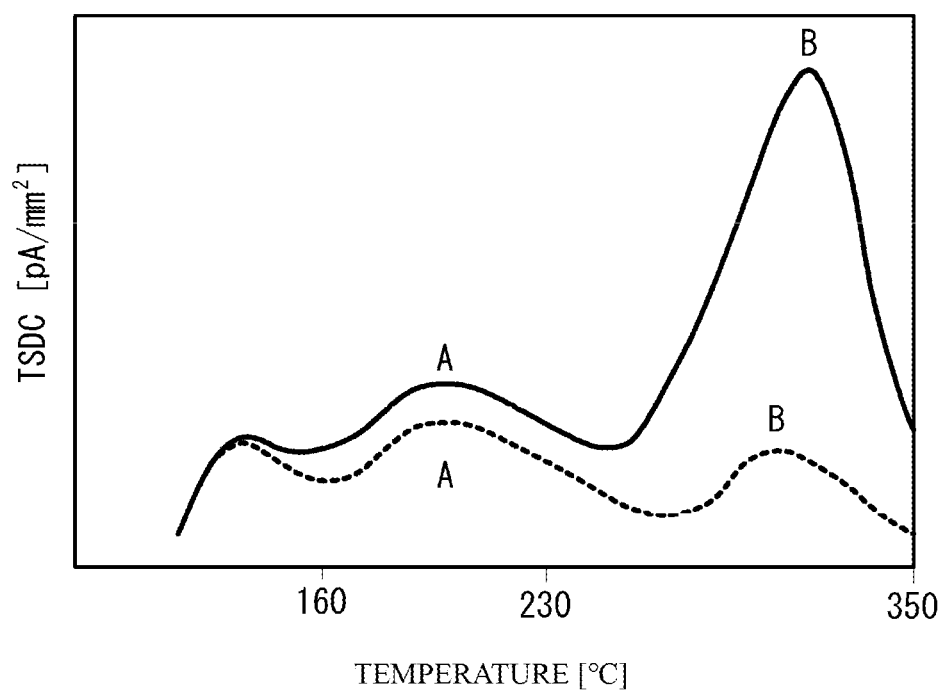
FIG. 3B illustrates a relationship between a temperature and a thermally stimulated current.

FIG. 3B illustrates a relationship between a temperature and the thermal stimulation current in a TSDC in a case where a polarizing temperature is 150 degrees C., an electric field is 15 V/μm to 20 V/μm, a polarizing time is 60 min, an increasing speed of temperature is 10 is 10 C°/min, and a temperature is increased to 350 degrees C. As illustrated in FIG. 3B, a plurality of current peaks appear in the TSDC data. Two typical main peaks coarsely appear at a temperature of 160 degrees C. or more. One of the peaks is a low temperature side peak (peak A) of a temperature range of 160 degrees C. or more and less than 230 degrees C. and a high temperature side peak (peak B) of a temperature range of 230 degrees C. or more and 350 degrees C. or less. In the method of FIG. 2A to FIG. 2E, the amount of the oxygen vacancy is estimated from an integrated value of the current peaks. The polarizing temperature is a temperature at which the dielectric layers 11 are polarized. The electric field of the polarizing is intensity of the electric field needed for polarizing the dielectric layers 11. The polarizing time is a time for polarizing the dielectric layers 11. The peaks are local maximum values in a case where the current value is expressed in a graph.

In FIG. 3B, a difference between the solid line and the dotted line appears because of the oxygen vacancies in the dielectric layers 11. The peak A of low temperature side in the temperature range of 160 degrees C. or more and less than 230 degrees C. and the peak B of high temperature side in the temperature range of 230 degrees C. or more and 350 degrees C. or less appear in the solid line and the dotted line. And two or more of the TSDC peaks appear in the temperature range of 130 degrees C. or more and 350 degrees C. or less. Three or more of the TSDC peaks may appear in the temperature range.

Only the integrated value does not associate actual reliability of the multilayer ceramic capacitor 100 with the TSDC data. This is because the oxygen vacancy 14 crossing over the crystal grain boundary 16 in the dielectric layer 11 largely influences on the reliability of the multilayer ceramic capacitor 100, as mentioned above. The current of the peak B indicates the moving of the oxygen vacancy 14 crossing over the crystal grain boundary 16. On the other hand, the current of the peak A indicates the oxygen vacancy which moves in the crystal grain 15 but does not cross over the crystal grain boundary 16. The influence of the peak A on the lifetime of the multilayer ceramic capacitor 100 is smaller than the influence of the peak B on the lifetime. Therefore, it is favorable that the peak B is small, from a viewpoint of improvement of the reliability.

The present inventors have found that a ratio of the peak current value $I_A$ of the peak A with respect to the peak current value $I_B$ of the peak B ($I_A/I_B$) is important for control of the reliability. In concrete, the present inventors have found that long lifetime can be achieved even if a relatively high electric field is applied, when the relationship of "$I_A/I_B>0.30$" is satisfied and the peak current value $I_B$ is 100 pA/mm$^2$ or less in the TSDC in which the polarizing temperature is 150 degrees C., the polarizing electric field is 15 V/μm to 20 V/μm, the polarizing time is 60 min, and the increasing speed of temperature is 10° C./min. With the method, it is possible to estimate the reliability of the multilayer ceramic capacitor 100 in a short time.

In the multilayer ceramic capacitor 100 of the embodiment, at least one of the dielectric layers 11 has a structure in which $I_A/I_B$ is more than 0.30, and $I_B \leq 100$ pA/mm$^2$. It is preferable that all of the dielectric layers 11 have the structure in which $I_A/I_B$ is more than 0.30 and $I_B \leq 100$ pA/mm$^2$.

For example, it is possible to make the structure in which $I_A/I_B$ is more than 0.30 and $I_B \leq 100$ pA/mm$^2$, by adjusting the composition, the crystal grain diameter, the firing condition and so on of the dielectric layers 11. From a viewpoint of improving the reliability, it is preferable that $I_A/I_B$ is 0.50 or more. It is preferable that $I_A/I_B$ is more than 0.50. It is preferable that $I_A/I_B$ is 0.70 or more. It is preferable that $I_A/I_B$ is more than 1.0. It is preferable that $I_A/I_B$ is 2.00 or more. It is preferable that $T_B$ is 95 pA/mm$^2$ or less. It is preferable that $T_B$ is 90 pA/mm$^2$ or less. It is preferable that $T_B$ is 85 pA/mm$^2$ or less. It is preferable that $T_B$ is 80 pA/mm$^2$ or less. It is preferable that $T_B$ is 50 pA/mm$^2$ or less. The unit of the current value is A/mm$^2$. The unit indicates a current value per a unit area. The value can be obtained by diving the current value measured with respect to the multilayer ceramic capacitor 100 by a total area of areas in which all internal electrode layers of the multilayer ceramic capacitor 100 face each other through a dielectric layer.

For example, $I_A/I_B$ gets larger, when the number of crystal grain boundary crossing electrical field or a thickness of the crystal grain boundary is enlarged. When $T_B$ is smaller, the reliability of the product is improved. When $T_B$ is close to zero, $I_A/I_B$ may be a very large value.

When the dielectric layers 11 include a plurality of crystal grains in the thickness direction, the peak A and the peak B remarkably appear. It is therefore preferable that the dielectric layers 11 include a plurality of crystal grains in the thickness direction. For example, it is preferable that an average number of the crystal grains per one of the dielectric layers 11 is 3 to 8. It is possible to calculate the average number of the crystal grains per one of the dielectric layers 11, by observing the cut cross section of the dielectric layer 11 in parallel with the stacking direction by an electronic microscopy, counting the number of the crystal grains crossing an arbitral straight line in parallel with the stacking direction in one of the dielectric layers 11, repeating the counting in 20 dielectric layers 11 which are selected optionally, and calculating an average value.

For example, an average thickness of the dielectric layers 11 is 1 μm or more and 3.5 μm or less. This is because it is preferable that the dielectric layer 11 includes a plurality of crystal grains in the thickness direction. When a cut section in parallel with the stacking direction of the dielectric layers 11 is observed by an electron microscopy, it is possible to calculate the average thickness by calculating an average value of thicknesses of 20 points which are optionally selected.

The values themselves of $I_A$, $I_B$ and ($I_A+I_B$) fluctuate in accordance with the size, the electrode structure, the thickness of the dielectric layers, the polarization condition, or other conditions of the multilayer ceramic capacitor 100. It is therefore difficult to control the lifetime of the multilayer ceramic capacitor 100, only with use of the values themselves. From the viewpoint, the embodiment focuses on the ratio of $I_A$ and $I_B$.

Figure 4:
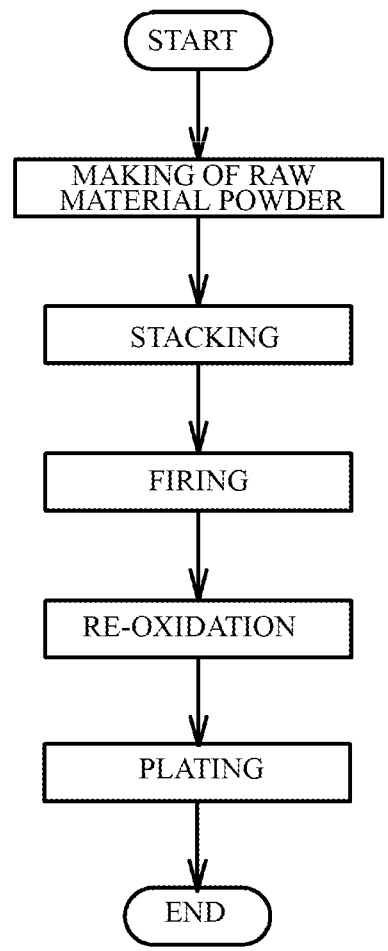
FIG. 4 illustrates a manufacturing method of a multilayer ceramic capacitor.

Next, a description will be given of a manufacturing method of the multilayer ceramic capacitor 100. FIG. 4 illustrates a manufacturing method of the multilayer ceramic capacitor 100.

(Making process of raw material powder) A dielectric material for forming the dielectric layer 11 is prepared. Generally, an A site element and a B site element are included in the dielectric layer 11 in a sintered phase of grains of ABO$_3$. For example, BaTiO$_3$ is tetragonal compound having a perovskite structure and has a high dielectric constant. Generally, BaTiO$_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si, or glass.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, the ceramic material acting as a main component of the dielectric layers is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a base material is coated with a stripe-shaped dielectric green sheet with a thickness of 1 μm or more, for example, a die coater method or a doctor blade method, and then dried.

Then, a pattern of the internal electrode layer 12 is provided on the surface of the dielectric green sheet by printing metal conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, $BaTiO_3$ having an average grain diameter of 50 nm or less may be evenly dispersed.

Then, the dielectric green sheet on which the internal electrode layer pattern is printed is stamped into a predetermined size, and a predetermined number (for example, 100 to 1000) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of the external electrodes 20a and 20b of different polarizations. A cover sheet to be the cover layer 13 is clamped to an upper face of the stacked dielectric green sheets, and another cover sheet to be the cover layer 13 is clamped to a lower face of the stacked dielectric green sheets. The resulting stacked structure is stamped into a predetermined size (for example, 1.0 mm×0.5 mm).

After that, the binder is removed from the ceramic multilayer structure in $N_2$ atmosphere. After that, metal conductive paste for the external electrodes 20a and 20b is provided from the both end faces to the side faces of the ceramic multilayer structure and is dried. The metal conductive paste includes a metal filer, a co-material, a binder, a solvent and so on. The metal conductive paste is to be ground layers of the external electrodes 20a and 20b.

(Firing process) The binder is removed in $N_2$ atmosphere in a temperature range of 250 degrees C. to 500 degrees C. After that, the resulting compact is fired for 10 minutes to 2 hours in a reductive atmosphere having an oxygen partial pressure of $10^{-8}$ to $10^{-13}$ atm in a temperature range of 1100 degrees C. to 1300 degrees C. Thus, each compound is sintered. In this manner, the ceramic multilayer structure is obtained.

(Re-oxidation process) After that, the re-oxidation process is performed in $N_2$ gas atmosphere in a temperature range of 600 degrees C. to 1000 degrees C. For example, the re-oxidation process is performed for 1 hour at 950 degrees C. After that, in a cooling process, the ceramic multilayer structure is cooled in the $N_2$ gas atmosphere, and the temperature of the ceramic multilayer structure is reduced to 500 degrees C. At 500 degrees C., the atmosphere is switched from the $N_2$ gas atmosphere to ambient air. And the ceramic multilayer structure is kept for 24 hours at 500 degrees C. And the ceramic multilayer structure is cooled to a room temperature. With the processes, it is possible to enlarge the oxygen concentration of the crystal grain boundary 16 of the dielectric layers 11. Thus, it is possible to largely reduced the peak current value of the TSDC. And it is possible to suppress the movement of the oxygen vacancy 14 crossing over the crystal grain boundary 16 or along the crystal grain boundary 16. Accordingly, it is possible to relatively reduce $I_B$ with respect to $I_A$. By the long-time keeping at 500 degrees C., multilayer ceramic capacitors having a large size and 1000 number of dielectric layers or more such as 4532 size (length is 4.5 mm, width is 3.2 mm, and height is 2.5 nn) can be sufficiently re-oxidized.

(Plating process) After that, with a plating process, ground layers of the external electrodes 20a and 20b are coated with a metal such as Cu, Ni, and Sn. With the processes, the multilayer ceramic capacitor 100 is manufactured.

In the manufacturing method of the embodiment, $I_A/I_B$ of at least one of the dielectric layers 11 is more than 0.30. And $I_B$ is 100 pA/mm² or less. Therefore, long lifetime can be achieved and reliability can be improved even if a relatively high electric field is applied.

(Second embodiment) A description will be given of a second embodiment. The TSCD condition is changed in the multilayer ceramic capacitor 100 described based on FIG. 1.

The present inventors have found that a long lifetime is achieved when decreasing with respect to increasing of the polarizing temperature is not observed in a peak current on the lowest side (near 150 degrees C.) in peak currents when increasing a temperature to 350 degrees C., in the TSDC of the dielectric layer 11 in which the polarizing time is 60 min, the polarizing electric field is 10 V/μm, the polarizing is achieved by changing the polarizing temperature within a temperature range of 150 degrees C. to 210 degrees C., and an increasing speed of temperature after cooling to 130 degrees C. is 10° C./min.

It is thought that the peak on the lowest side (around 150 degrees C.) is caused by dipole of vacancy (cluster of oxygen vacancy, cation vacancy, metal vacancy or the like). When the peak does not decrease with respect to increasing of the polarizing temperature, the cluster is not dissociated and the oxygen vacancy is hardly migrated. It is therefore thought that the increasing of the peak on the higher temperature side having a large influence on the reliability of the multilayer ceramic capacitor is suppressed.

In concrete, a peak current value of a TSDC peak around 150 degrees C. in a case of polarization at a polarizing temperature of 150 degrees C. is referred to as J150. A peak current value of a TSDC peak around 150 degrees C. in a case of polarization at a polarizing temperature of 170 degrees C. is referred to as J170. When a relationship of "xJ=(J170−J150)/J150≥0" is satisfied, a long lifetime is achieved. In a normal TSDC, a temperature is increased to 350 degrees C. or more. However, in the embodiment, the temperature is increased to 350 degrees C. or so. It is therefore possible to simply evaluate the reliability of the multilayer ceramic capacitor 100.

Figure 5:
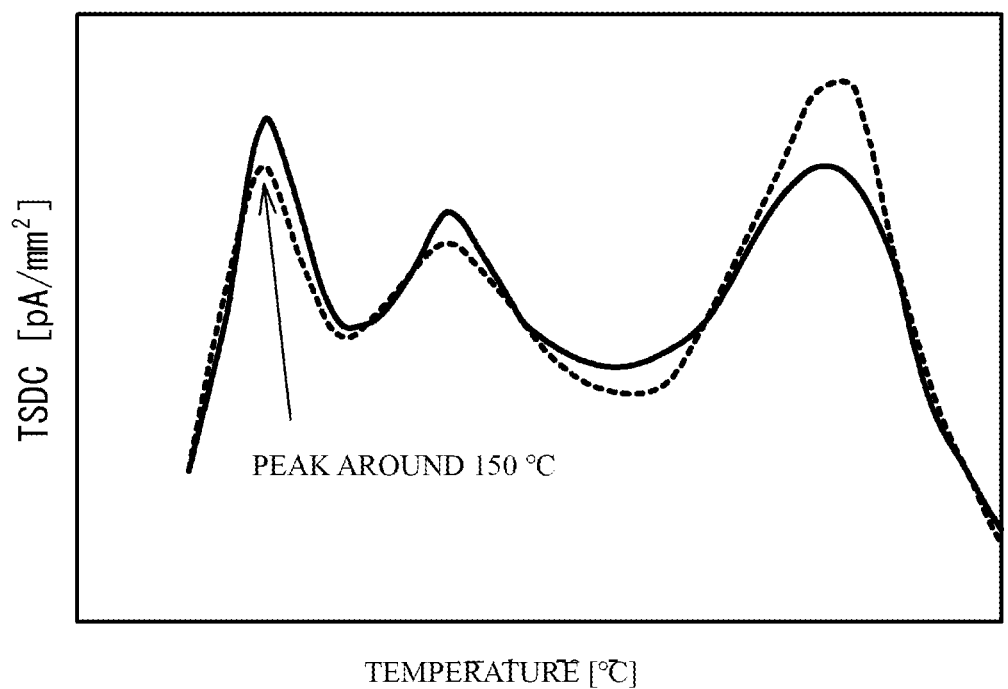
FIG. 5 illustrates a relationship between a temperature and a thermally stimulated current.

FIG. 5 illustrates J170 and J150. In FIG. 5, a solid line indicates the TSDC in the case of the polarization at 170 degrees C. A dotted line indicates the TSDC in the case of the polarization at 150 degrees C. As illustrated in FIG. 5, in both J170 and 150, a peak is observed around 150 degrees C. J170 is larger than J150. A temperature of a peak in J170 and J150 is observed within 130 degrees C. to 150 degrees C.

In the multilayer ceramic capacitor 100 of the embodiment, at least one of the dielectric layers 11 has a structure satisfying the relationship of "ΔJ=(J170−J150)/J150≥0". It is preferable that all of the dielectric layers 11 have the structure satisfying the relationship of "ΔJ=(J170−J150)/J150≥0".

The relationship of "ΔJ=(J170−J150)/J150≥0" can be achieved by adjusting parameters such as the composition, the crystal grain diameter or the firing condition of the dielectric layers 11. In a viewpoint of improving the reliability, it is preferable that the relationship of "ΔJ=(J170−J150)/J150≥0.5" is satisfied. It is more preferable that the relationship of "ΔJ=(J170−J150)/J150≥1.0" is satisfied.

It is possible to enlarge ΔJ=(J170−J150)/J150 by increasing the number of crystal grain boundary crossing over electric field or thickening the crystal grain boundary. However, when ΔJ=(J170−J150)/J150 is excessively large, the electrostatic capacity of the product may be degraded. It is therefore preferable that ΔJ=(J170−J150)/J150 has an upper limit from a viewpoint of securing capacity and achieving high reliability. For example, it is preferable that ΔJ=(J170−J150)/J150 is 2.0 or less. It is more preferable that ΔJ=(J170−J150)/J150 is 1.5 or less. It is still more preferable that ΔJ=(J170−J150)/J150 is 1.25 or less.

With respect to the above-mentioned TSDC, it is preferable that decreasing with respect to increasing of the polarizing temperature is not observed in a peak current on the lowest side (near 150 degrees C.) in peak currents when increasing a temperature to 350 degrees C., in the TSDC in which an increasing speed of temperature after cooling to 130 degrees C. is 10° C./min, even if both of the polarizing temperature from 150 degrees C. to 210 degrees C. are notified.

The multilayer ceramic capacitor 100 of the embodiment can be manufactured by the same manufacturing method as the first embodiment. In the manufacturing method, at least one of the dielectric layers 11 satisfies the relationship of "A J=(J170−J150)/J150". In this case, even if the multilayer ceramic capacitor 100 is used under a relatively high temperature environment, the multilayer ceramic capacitor 100 achieves a long lifetime and has high reliability.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors of the above-mentioned embodiments were made. And characteristic was measured.

Example 1

Barium titanate powder was prepared as a dielectric material. Additive compound was added to the barium titanate powder. The barium titanate powder and the additive compound were wet-blended with each other in a ball mill and were crushed. Thus, a dielectric material was obtained. An organic binder and a solvent were added to the dielectric material. A dielectric green sheet was made by a doctor blade method. As the organic binder, a butyral-based material was added to the dielectric material. As the solvent, toluene and ethyl alcohol were added to the dielectric material. In addition, a plasticizer and so on were added to the dielectric material.

Next, metal conductive paste for forming internal electrode layers was made with use of planetary ball mill. The metal conductive paste included the main component of the internal electrode layers 12, the co-material, the binder (ethyl cellulose), the solvent and necessary additive.

The metal conductive paste for forming internal electrode layers was printed on the resulting dielectric green sheet. 301 numbers of the dielectric green sheets on which the metal conductive paste was printed were stacked. A cover sheet was stacked on an upper face and a lower face of the stacked dielectric green sheets and was thermally clamped. The resulting multilayer structure was cut into a predetermined size.

The binders were removed in $N_2$ atmosphere. After that, as the ground layer, metal conductive paste including a metal filler of which a main component was Ni, a co-material, a binder, a solvent or the like was painted from both edge faces to each side face of the multilayer structure. The metal conductive paste was dried. The resulting multilayer structure was fired in a reductive atmosphere for 10 minutes to 2 hours at a temperature of 110 degrees C. to 1300 degrees C. Thus a sintered structure was formed. The sintered structure had a length of 3.2 mm, a width of 1.6 mm and a height of 1.6 mm.

After that, the re-oxidation process was performed. The sintered structure was kept at 950 degrees C. in $N_2$ gas atmosphere for 1 hour. After that, the temperature of the sintered structure was reduced to 500 degrees C. in the $N_2$ gas atmosphere. The atmosphere was switched to normal air. The sintered structure was kept at 500 degrees C. for 24 hours. After that, the temperature of the sintered structure was reduced to the room temperature. After that, a Cu-plated layer, a Ni-plated layer and a Sn-plated layer were formed on a surface of the base layer by the plating method. Thus, the multilayer ceramic capacitor 100 was obtained. The thickness of the dielectric green sheet was adjusted so that the average thickness of the dielectric layer 11 observed in a cross section was 1.2 μm.

Example 2

In an example 2, the temperature of the sintered structure was kept at 500 degrees C. for 20 hours after switching the atmosphere to the normal air. Other conditions were the same as those of the example 1.

Example 3

In an example 3, the temperature of the sintered structure was kept at 500 degrees C. for 30 hours after switching the atmosphere to the normal air. Other conditions were the same as those of the example 1.

Example 4

In an example 4, the number of the dielectric layers 11 was 1100. The average thickness of each of the dielectric layers 11 observed in the cross section was 0.7 μm. Other conditions were the same as those of the example 1.

Example 5

In an example 5, the number of the dielectric layers 11 was 100. The average thickness of each of the dielectric layers observed in the cross section was 3.6 nm. Other conditions were the same as those of the example 1.

Comparative Example 1

In a comparative example 1, the sintered structure was kept at 950 degrees C. in the $N_2$ gas atmosphere for 1 hour, in the re-oxidation process. After that, the temperature of the sintered structure was reduced to 500 degrees C. in the $N_2$ gas atmosphere. After that, the atmosphere was switched to the normal air, and the temperature of the sintered structure was reduced to the room temperature. That is, the keeping at 500 degrees C. was not performed. Other conditions were the same as those of the example 1.

Comparative Example 2

In a comparative example 2, the sintered structure was kept at 950 degrees C. in the $N_2$ gas atmosphere for 1 hour, in the re-oxidation process. After that, the temperature of the sintered structure was reduced to 500 degrees C. in the $N_2$ gas atmosphere. After that, the atmosphere was switched to the normal air. The sintered structure was kept at 500 degrees C. for 5 hours. After that, the temperature of the sintered structure was reduced to the room temperature. That is, the time for the keeping at 500 degrees C. was shorter than that of the example 1. Other conditions were the same as those of the example 1.

Comparative Example 3

In a comparative example 3, the sintered structure was kept at 950 degrees C. in the $N_2$ gas atmosphere for 1 hour, in the re-oxidation process. After that, the temperature of the sintered structure was reduced to 500 degrees C. in the $N_2$ gas atmosphere. After that, the atmosphere was switched to the normal air. The sintered structure was kept at 500 degrees C. for 15 hours. After that, the temperature of the sintered structure was reduced to the room temperature. That is, the time for the keeping at 500 degrees C. was shorter than that of the example 1. Other conditions were the same as those of the example 1.

(Analysis 1) With respect to each of the examples 1 to 5 and the comparative examples 1 to 3, $I_A/I_B$ was measured in the TSDC in which the polarizing temperature was 150 degrees C., the polarizing time was 60 min, the polarizing electric field was 20 V/μm, the increasing speed of temperature was 10 degrees C./min. Each of the examples 1 to 5 and the comparative examples 1 to 3 was subjected to HALT (Highly Accelerated limit Test) at a high temperature of 150 degrees C. and at a high electric field of 40 V/μm. Table 1 shows the results. MTTF (Mean Time To Failure) was measured with respect to each 20 samples of the examples 1 to 5 and the comparative examples 1 to 3. A lifetime until electric conduction was measured. An average of the lifetime was calculated as the MTTF.

TABLE 1

| | | $I_B$ | MTTF | |
|---|---|---|---|---|
| | $I_A/I_B$ | (pA/mm$^2$) | min | hr |
| EXAMPLE 1 | 0.35 | 90 | 15000 | 250 |
| EXAMPLE 2 | 0.70 | 95 | 12500 | 208 |
| EXAMPLE 3 | 2.00 | 20 | 23000 | 383 |
| EXAMPLE 4 | 0.50 | 80 | 12000 | 200 |
| EXAMPLE 5 | 3.00 | 20 | 30000 | 500 |
| COMPARATIVE EXAMPLE 1 | 0.15 | 500 | 100 | 1.7 |
| COMPARATIVE EXAMPLE 2 | 0.35 | 250 | 500 | 8.3 |
| COMPARATIVE EXAMPLE 3 | 1.50 | 105 | 2000 | 33 |

In the examples 1 to 5 and the comparative examples 1 to 3, the average number of the crystal grains in the dielectric layers in the thickness direction was 3 to 10.

As shown in Table 1, in the example 1, $I_A/I_B$ was 0.35, and $I_B$ was 90 pA/mm$^2$. In the example 2, $I_A/I_B$ was 0.70, and $I_B$ was 95 pA/mm$^2$. In the example 3, $I_A/I_B$ was 2.00, and $I_B$ was 20 pA/mm$^2$. In the example 4, $I_A/I_B$ was 0.50, and $I_B$ was 80 pA/mm$^2$. In the example 5, $I_A/I_B$ was 3.00, and $I_B$ was 20 pA/mm$^2$. In the comparative example 1, $I_A/I_B$ was 0.15, and $I_B$ was 500 pA/mm$^2$. In the comparative example 2, $I_A/I_B$ was 0.35, and $I_B$ was 250 pA/mm$^2$. In the comparative example 3, $I_A/I_B$ was 1.50, and $I_B$ was 105 pA/mm$^2$.

The MTTF of the examples 1 to 5 was more than 2000 min. Therefore, long lifetime was achieved. It is thought that this was because the relationship of "$I_A/I_B>0.30$" was satisfied, and the peak current $I_B$ at the maximum temperature was 100 pA/mm$^2$ or less. In contrast, the MTTF of the comparative example 1 was a short time of 100 min. It is thought that this was because $I_A/I_B$ was a low value of 0.15, and the $I_B$ was not sufficiently small. The MTTF of the comparative example 2 was a short time of 500 min. It is thought that this was because although $I_A/I_B$ was a high value of 0.35, $I_B$ was a high value of 250 pA/mm$^2$ and the $I_B$ was not sufficiently small. The MTTF of the comparative example 3 was a short time of 2000 min. It is thought that this was because although $I_A/I_B$ was a high value of 1.50, the $I_B$ was a high value of 105 pA/mm$^2$ and the $I_B$ was not sufficiently small.

Example 6

In an example 6, the manufacturing method and the conditions were the same as those of the example 1.

Example 7

In an example 7, the manufacturing method and the conditions were the same as those of the example 2.

Example 8

In an example 8, the manufacturing method and the conditions were the same as those of the example 3.

Example 9

In an example 9, the manufacturing method and the conditions were the same as those of the example 4.

(Example 10) In an example 10, the manufacturing method and the conditions were the same as those of the example 5.

Comparative Example 4

In a comparative example 4, the sintered structure was kept at 950 degrees C. in the $N_2$ gas atmosphere for 1 hour, in the re-oxidation process. After that, the temperature of the sintered structure was reduced to 500 degrees C. in the $N_2$ gas atmosphere. After that, the atmosphere was switched to the normal air, and the temperature of the sintered structure was reduced to the room temperature. That is, the keeping at 500 degrees C. was not performed. Other conditions were the same as those of the example 1.

Comparative Example 5

In a comparative example 5, the sintered structure was kept at 950 degrees C. in the $N_2$ gas atmosphere for 1 hour, in the re-oxidation process. After that, the temperature of the sintered structure was reduced to 500 degrees C. in the $N_2$ gas atmosphere. After that, the atmosphere was switched to the normal air. The sintered structure was kept at 500 degrees C. for 10 hours. After that, the temperature of the sintered structure was reduced to the room temperature. That is, the time for the keeping at 500 degrees C. was shorter than that of the example 1. Other conditions were the same as those of the example 1.

(Analysis 2) With respect to each of the examples 6 to 10 and the comparative examples 4 and 5, $\Delta J=(J170-J150)/J150$ was measured by measuring J 150 and J170 in the TSDC in which the polarizing time was 60 min, the polarizing electric field was 10 V/μm, the polarization was achieved by changing the temperature within 150 degrees C. to 210 degrees C., and the increasing speed of temperature was 10 degrees C./min after cooling to the 130 degrees C. Each of the examples 6 to 10 and the comparative examples 4 and 5 was subjected to HALT (Highly Accelerated limit Test) at a high temperature of 150 degrees C. and at a high electric field of 40 V/μm. Table 1 shows the results. MTTF (Mean Time To Failure) was measured with respect to each 20 samples of the examples 6 to 10 and the comparative examples 4 and 5. A lifetime until electric conduction was measured. An average of the lifetime was calculated as the MTTF.

In the examples 6 to 10 and the comparative examples 4 and 5, the average number of the crystal grains in the dielectric layers in the thickness direction was 3 to 10.

Figure 6:
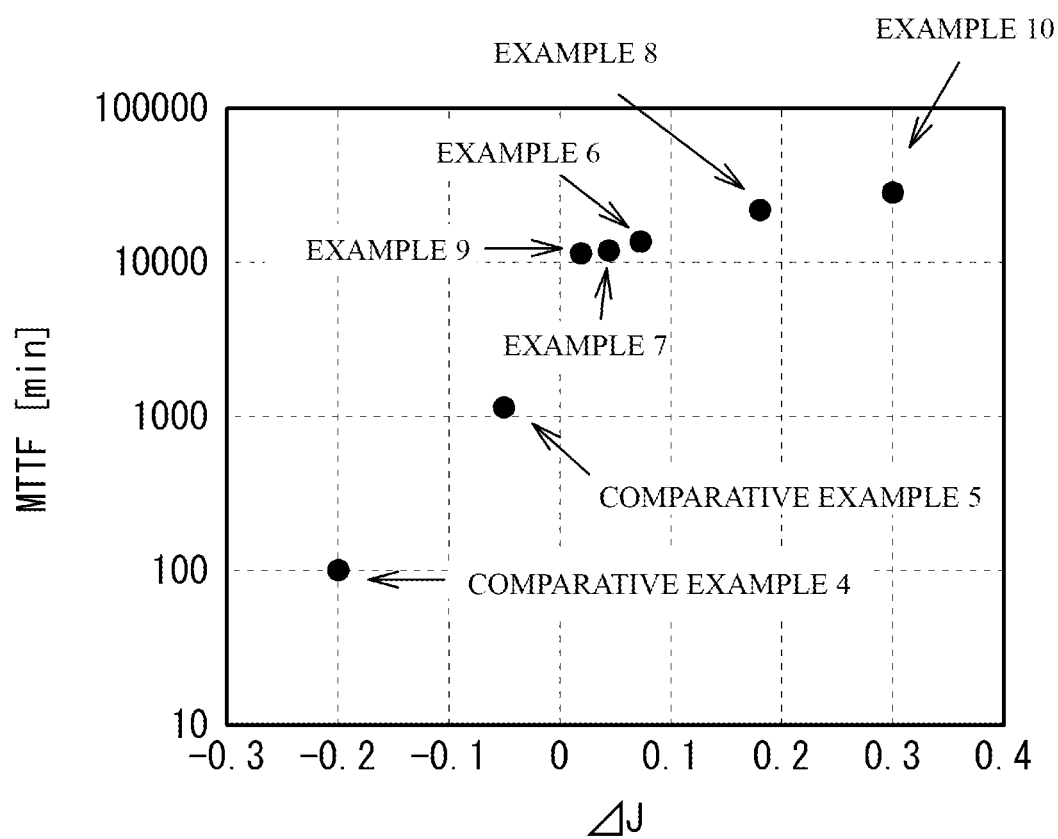
FIG. 6 illustrates results of examples 6 to 10 and the comparative examples 4 and 5.

As illustrated in FIG. 6, in the example 6, the MTTF was 15000 min, and AJ was 0.07. In the example 7, the MTTF was 12500 min, and AJ was 0.04. In the example 8, the MTTF was 23000 min, and AJ was 0.18. In the example 9, the MTTF was 12000 min, and AJ was 0.02. In the example 10, the MTTF was 30000 min, and AJ was 0.3. In the comparative example 4, the MTTF was 100 min, and AJ was -0.2. In the comparative example 5, the MTTF was 1200 min, and AJ was -0.05.

In the examples 6 to 10, the MTTF was more than 2000 min. And a long lifetime was achieved. It is thought that this was because AJ was 0 or more. On the other hand, in the comparative examples 4 and 5, the MTTF was less than 2000 min. It is thought that this was because AJ was less than 0.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer structure in which each of a plurality of dielectric layers and each of a plurality of internal electrode layers are alternately stacked, a main component of the plurality of dielectric layers being a ceramic,
   wherein a relationship of "$I_A/I_B>0.30$" is satisfied and a peak current value $I_B$ is 100 pA/mm$^2$ or less in a TSDC in which a polarizing temperature is 150 degrees C., a polarizing electric field is 15 V/μm to 20 V/μm, a polarizing time is 60 minutes, and an increasing speed of temperature is 10° C./minute, when a peak current of a low temperature side of a temperature range of 160 degrees C. or more and less than 230 degrees C. is $I_A$ and a peak current of a high temperature side of a temperature range of 230 degrees C. or more and 350 degrees C. or less is $I_B$.

2. The ceramic electronic device as claimed in claim 1, wherein a relationship of "$I_A/I_B \geq 0.50$" is satisfied.

3. The ceramic electronic device as claimed in claim 1, wherein a relationship of "$I_A/I_B \geq 0.70$" is satisfied.

4. The ceramic electronic device as claimed in claim 1, wherein a relationship of "$I_A/I_B \geq 2.00$" is satisfied.

5. The ceramic electronic device as claimed in claim 1, wherein $I_B$ is 95 pA/mm$^2$ or less.

6. The ceramic electronic device as claimed in claim 1, wherein $I_B$ is 90 pA/mm$^2$ or less.

7. The ceramic electronic device as claimed in claim 1, wherein $I_B$ is 80 pA/mm$^2$ or less.

8. The ceramic electronic device as claimed in claim 1, wherein an average thickness of each of the plurality of dielectric layers is 1 μm or more.

9. The ceramic electronic device as claimed in claim 1, wherein an average thickness of each of the plurality of dielectric layers is 3.5 μm or more.

10. The ceramic electronic device as claimed in claim 1, wherein an average number of crystal grains in a thickness direction of each of the plurality of dielectric layers is 3 or more.

11. The ceramic electronic device as claimed in claim 1, wherein a number of the plurality of dielectric layers is 1000 or more.

12. The ceramic electronic device as claimed in claim 1, wherein a main component of the plurality of dielectric layers is $BaTiO_3$.

13. The ceramic electronic device as claimed in claim 1, wherein a number of TSDC peaks in a temperature range of 130 degrees C. or more and 350 degrees C. or less is 2 or more.

14. The ceramic electronic device as claimed in claim 1, wherein a number of TSDC peaks in a temperature range of 130 degrees C. or more and 350 degrees C. or less is 3 or more.

15. A ceramic electronic device comprising:
    a multilayer structure in which each of a plurality of dielectric layers and each of a plurality of internal electrode layers are alternately stacked, a main component of the plurality of dielectric layers being a ceramic,
    wherein a relationship of "$(J170-J150)/J150 \geq 0$" is satisfied in a TSDC in which a polarizing time is 60 minutes, a polarizing electric field is 10 V/μm, a polarizing temperature is 150 degrees C. or 170 degrees C., the plurality of dielectric layers are polarized, an increasing speed of temperature is 10° C./minute after cooling to 130 degrees C., when a peak current value of a polarization at 150 degrees C. among peak currents in a case of a temperature rise to 350 degrees C. is J150 and a peak current value of a polarization at 170 degrees C. among the peak currents is J170.

16. The ceramic electronic device as claimed in claim 15, wherein an average thickness of each of the plurality of dielectric layers is 1 μm or more.

17. The ceramic electronic device as claimed in claim 15, wherein an average thickness of each of the plurality of dielectric layers is 3.5 μm or more.

18. The ceramic electronic device as claimed in claim 15, wherein an average number of crystal grains in a thickness direction of each of the plurality of dielectric layers is 3 or more.

19. The ceramic electronic device as claimed in claim 15, wherein a number of the plurality of dielectric layers is 1000 or more.

20. The ceramic electronic device as claimed in claim 15, wherein a main component of the plurality of dielectric layers is $BaTiO_3$.

* * * * *